United States Patent Office 3,637,648
Patented Jan. 25, 1972

3,637,648
REACTIVE MONAZO-DYESTUFFS
Rudolf Kühne and Fritz Meininger, Frankfurt am Main, and Heinrich Frölich, Kelkheim, Taunus, Germany, assignors to Farbwerke Hoechst Aktiengesellschaft vormals Meister Lucius & Bruning, Frankfurt am Main, Germany
No Drawing. Continuation-in-part of application Ser. No. 365,489, May 6, 1964. This application July 9, 1963, Ser. No. 743,275
Claims priority, application Germany, May 14, 1963, F 39,735
Int. Cl. C09d 29/38, 29/16
U.S. Cl. 260—162    6 Claims

ABSTRACT OF THE DISCLOSURE

Reactive monoazo dyestuffs containing as reactive groupings one or two groups of the formula $$-\overset{R'}{\underset{|}{N}}-SO_2-Y$$

wherein Y represents one of the moieties

—CH$_2$—CH$_2$—Cl, —CH$_2$—CH$_2$—Br
—CH$_2$—CH$_2$—O—SO$_3$H,

—CH$_2$—CH$_2$—O—$\overset{O}{\underset{||}{C}}$—CH$_3$—CH$_2$—CH$_2$—O—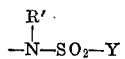

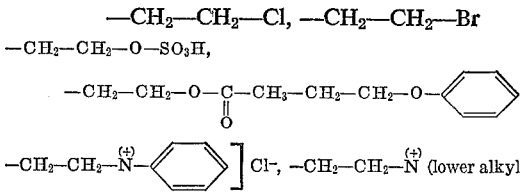

and —CH=CH$_2$, and R' is lower alkyl or benzyl, which are suitable for the dyeing or printing of leather, wool, silk, textile materials of polyamides, polyactylonitrile, polyurethanes or cellulose.

---

The present application is a continuation-in-part application of our copending application Ser. No. 365,489, filed May 6, 1964, now abandoned and relates to novel azo-dyestuffs and to a process for preparing them; more particularly it relates to azo-dyestuffs of the formula

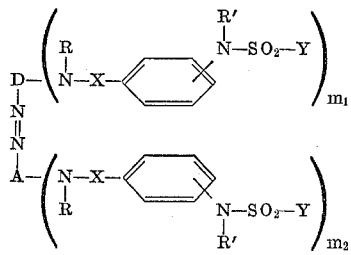

wherein D represents phenyl, monosulfophenyl, disulfophenyl, monocarboxyphenyl, monosulfo-monocarboxyphenyl, monochloro-monosulfo-phenyl, mono-lower alkyl-monochloro-monosulfo-phenyl, mono(lower alkyl)-monosulfo-phenyl, mono(lower alkoxy)-monosulfo-phenyl, dichloro-monosulfo-phenyl, monotrifluoromethyl-monsulfophenyl, mono-acetylamino-phenyl, monobenzoylaminophenyl, mono-acetylamino-monosulfo-phenyl, mono-(dichloro-triazinyl-amino)-phenyl, monosulfo-naphthyl, disulfonaphthyl, trisulfonaphthyl,

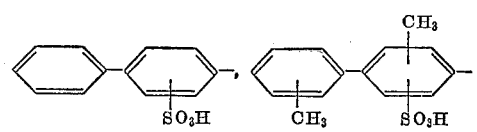

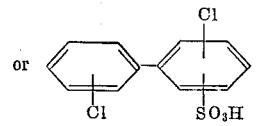

A represents the radical of a coupling compound of the group consisting of (a) hydroxynaphthalene substituted by 1 to 3 sulfonic acid groups and in addition by

—NH—CO—CH$_3$, —NH—CO—NH$_2$, —NH$_2$

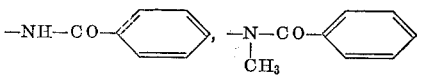

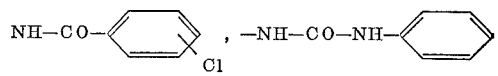

and

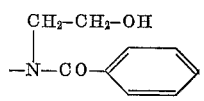

(b) a 3-carboxy-5-pyrazolone or a 1-phenyl (or 1-naphthyl)-5-pyrazolone substituted in the 3-position by methyl or carboxyl;
(c) a 1-phenyl (or 1-naphthyl)-5-pyrazolone substituted in the 3-position by methyl or carboxyl and substituted on the phenyl or naphthyl by 1 to 2 sulfonic acid groups or by nitro;
(d) a 1-phenyl (or 1-naphthyl)-5-pyrazolone substituted in the 3-position by methyl or carboxyl and substituted on the phenyl or naphthyl by a sulfonic acid group and 1 to 2 chlorine atoms; and
(e) an acetoacetic acid phenylamide substituted on the phenyl group by sulfonic acid group or carboxylic acid group;

R represents a member of the group consisting of hydrogen and lower alkyl, X represents a member of the group consisting of —SO$_2$—, —CO— and —CO—NH—; Y represents a member of the group consisting of —CH$_2$—CH$_2$—Cl, —CH$_2$—CH$_2$—Br
CH$_2$—CH$_2$—O—SO$_3$H, —CH$_2$—CH$_2$—O—CO—CH$_3$

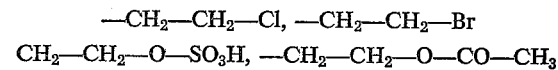

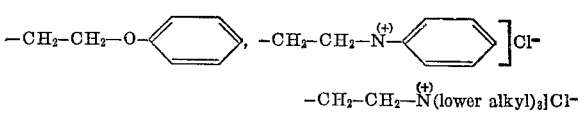

and —CH=CH$_2$; R' represents lower alkyl or benzyl, and $m_1$ and $m_2$ represent integers from 0 to 2, the sum of $m_1$ and $m_2$ being at most 2 and at least 1.

It has been found that novel reactive azo-dyestuffs of the Formula 1 indicated above can be prepared by combining diazotized aromatic amines of the Formula 2

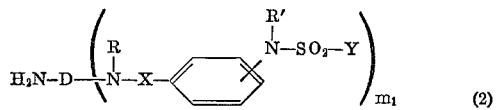

wherein D, R, X, Y and R' and $m_1$ are defined as above, with coupling components of the Formula 3

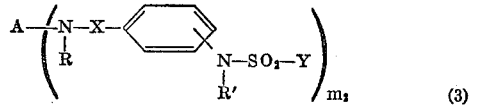

wherein A, R, X, Y and R' and $m_2$ are defined as above, the diazo and coupling components of the Formulae 2 and 3 being chosen in such a way that the sum of $m_1$ and $m_2$ in the prepared dyestuffs is at most 2 and at least 1.

These components can be prepared, for example, by reacting suitably substituted primary or secondary amines with compounds of the Formula 4

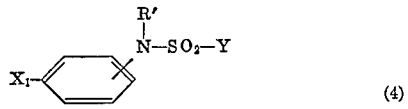

in which $X_1$ represents a carboxylic acid halide, a sulfonic acid halide or the isocyanate group and R' and Y have the meanings given above. These reactions can advantageously be carried out in an aqueous medium at temperatures between about 0°–60° C., preferably between about 0°–5° C., if acid chlorides are used, a weakly acid pH-range is maintained in the presence or by the gradual addition of mineral acid-binding or saturating agents, for example sodium acetate, sodium hydroxide or sodium carbonate, and if isocyanates are used ($X_1=-N=C=O$), the neutral or weakly alkaline pH-range is maintained, if desired by the addition of buffer salt mixtures.

Instead of the isocyanates of the afore-mentioned Formula 4, there may also be used the corresponding aniline derivatives ($X_1=NH_2$) for preparing the diazo and azo components, said derivatives being reacted in a weakly alkaline aqueous medium with suitably substituted urethanes. By condensing 4-(N-methyl-ethionylamino)-1-aminobenzene with the urethane, obtained by reaction of 2-amino-5-hydroxynapthalene-7-sulfonic acid and phenol chlorocarbonic acid ester, there is obtained a valuable coupling component for preparing the new azo-dyestuffs.

As examples of coupling and diazo components which can be prepared in such a way and contain a radical of the formula

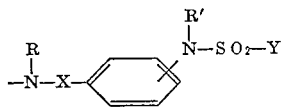

there may be mentioned:

(a) as diazo components the reaction products of 1 mol of the compound of the Formula 4 with 1 mol of 1,3-diaminobenzene or 1,4-diaminobenzene, 1,3-diaminobenzene-4-sulfonic acid or 1,4-diaminobenzene-3-sulfonic acid, 1,4-diaminobenzene-2-carboxylic acid, 4-(4'-aminobenzoylamino)-1-aminobenzene-2-sulfonic acid, 2-methoxy-1,4-diaminobenzene-5-sulfonic acid, 2,6-diaminonaphthalene-4,8-disulfonic acid, 4,4'-diamino-1,1'-diphenyl-3-sulfonic acid, 4,4'-diamino-2,2'-dimethyl-1,1'-diphenyl-5-sulfonic acid or 4,4'-diamino-2,2'-dichloro-1,1'-diphenyl-5-sulfonic acid;

(b) as coupling components the reaction products of 1 mol of the compound of the Formula 4 with 1 mol of 1-amino-8-hydroxynaphthalene-3,6-disulfonic acid or 1-amino-8-hydroxynaphthalene-4,6-disulfonic acid, 2-amino-8-hydroxynaphthalene-6-sulfonic acid, 2-amino-5-hydroxynaphthalene-7-sulfonic acid, 1-amino-5-hydroxynaphthalene-7-sulfonic acid, 2-amino-5-hydroxynaphthalene-1,7-disulfonic acid, 2-(4'-aminobenzoylamino)-5-hydroxynaphthalene-7-sulfonic acid, 1-(3'- or 4'-aminobenzoylamino)-8-hydroxynaphthalene-3,6-disulfonic acid or 1-(3'- or 4'-amino-benzoylamino)-8-hydroxynaphthalene-4,6-disulfonic acid, 1-acetoacetylamino-4-aminobenzene-3-carboxylic acid or 1-acetoacetylamino-4-aminobenzene-3-sulfonic acid or 1-(3'- or -4'-aminophenyl)-5-pyrazolone-3-carboxylic acid.

The starting compounds of the Formula 4 can be used for the preparation of said components either as such, if desired with the addition of an emulsifier in order to obtain a better distribution in the aqueous phase, or dissolved in a suitable organic solvent such as chloroform, benzene, toluene, dimethylformamide, chlorobenzene or acetone. The preparation of the new components is described in detail in the examples.

As starting compounds of the Formula 4 which may be used according to the present invention for preparing suitable diazo or coupling components there may be mentioned for example:

4-(N-methyl-β-chloroethyl-sulfonylamino)-benzene-1-carboxylic acid chloride,
3-(N-methyl-β-chloroethylsulfonylamino)-benzene-1-carboxylic acid chloride,
2-(N-methyl-β-chloroethylsulfonylamino)-benzene-1-carboxylic acid chloride,
2-(N-ethyl-β-chloroethylsulfonylamino)-benzene-1-carboxylic acid chloride,
2-(N-butyl-β-chloroethylsulfonylamino)-benzene-1-carboxylic acid chloride,
4-(N-methyl-vinylsulfonylamino)-benzene-1-carboxylic acid chloride,
3-(N-methyl-vinylsulfonylamino)-benzene-1-sulfonic acid chloride,
4-(N-methyl-β-chloroethylsulfonylamino)-3-chlorobenzene-1-carboxylic acid chloride,
4-β-chloroethylsulfonylamino-benzene-1-carboxylic acid chloride,
4-(N-methyl-vinylsulfonylamino)-2,5-dimethylbenzene-1-isocyanate,
3-(N-methyl-vinylsulfonylamino)-benzene-1-isocyanate,
3-(N-β-chlorethyl-vinylsulfonylamino)-benzene-1-isocyanate,
3-(N-methyl-β-chlorethylsulfonylamino)-4-chlorobenzene-1-isocyanate,
4-(N-methyl-β-trimethyl-ammonium chloride-ethylsulfonylamino)-benzene-1-carboxylic acid chloride,
4-N-methyl-β-pyridinium chloride ethylsulfonylamino)-benzene-1-carboxylic acid chloride,
4-(N-methyl-β-bromethylsulfonylamino)-benzene-1-carboxylic acid bromide,
4-(N-methyl-β-acetoxy-ethylsulfonylamino)-benzene-1-carboxylic acid chloride or 4-(N-methyl-β-acetoxyethylsulfonylamino)-benzene-1-sulfonic acid chloride,
3-(N-methyl-β-chlorethylsulfonylamino)-benzene-1-sulfonic acid chloride,
4-(N-methyl-vinylsulfonylamino)-1-sulfonic acid chloride or 4-(N-methyl-β-phenoxyethyl-sulfonylamino)-benzene-1-carboxylic acid chloride.

The acid halide and isocyanate compounds used as starting compounds for preparing the dyestuffs according to the process of the present invention are new compounds. The said halides can be prepared, for example, by (a) reacting aminobenzene-carboxylic acids or aminobezene sulfonic acids with acylating agents which introduce the vinyl sulfonic acid group, for example with carbyl sulfate or vinyl sulfonic acid chloride, or
(b) causing for example acetic acid anhydride, methane sulfonic acid chloride or p-toluene sulfonic acid chloride to act on isethionyl-aminobenzene carboxylic acids or isethionylaminobenzene sulfonic acids, whereby the hydroxy group in β-position is esterified, or
(c) ethionylaminobenzene carboxylic acids, or vinylsulfonylaminobenzene carboxylic acids, ethionylaminobenzene sulfonic acids or vinyl sulfonyl-aminobenzene sulfonic acids are reacted with phenols or dialkylamines in which case the corresponding β-phenoxy or β-dialkylamino compounds are formed. The β-dialkylamino compounds can then be converted into quaternary ammonium compounds by reaction with alkylating agents such as dimethyl sulfate or methyl chloride.

The compounds obtained according to the methods described sub (a), (b) and (c) are finally converted in known manner into the corresponding carboxylic acid halides or sulfonic acid halides, if desired after the alkylation of the aromatically bound nitrogen atom.

The isocyanate compounds can, for example, be prepared in such a way that aniline derivatives containing a vinylsulfonylamino group or an ethylsulfonylamino group substituted in β-position, are reacted in known manner with phosgene, the amino group being converted into an isocyanate group.

Finally, the sulfonic acid chlorides of the Formula 4 can likewise be prepared according to the method described by H. Meerwein [vol. 90, 841 (1957)] by diazotizing the aforementioned aniline derivatives and reacting the diazonium salts obtained subsequently with sulfur dioxide in the presence of acetic acid and copper chloride.

Those of the new dyestuffs that contain groups imparting solubility in water are suitable for dyeing and printing various materials, for example silk, wool, leather, synthetic polyamides and polyurethanes, regenerated protein materials and cellulose materials, in particular cotton, linen and viscose rayon. The new dyestuffs are applied to the materials according to the usual dyeing and printing processes in the presence of acid-binding agents.

Those of the new dyestuffs which do not contain groups imparting solubility in water, for example sulfonic acid or carboxylic acid groups, can be used preferably in the form of aqueous dispersion for dyeing the afore-mentioned textile materials, or, if desired, for dyeing aromatic polyester fibres.

The dyeing with the new dyestuffs can, for example, be carried through by treating the cellulose textile material with an aqueous solution of the dyestuff which may likewise be a thickening printing paste and by causing acid-binding agents, for example sodium hydroxide, sodium bicarbonate, sodium trichloracetate or sodium carbonate to act on it either before, after or simultaneously with the treatment. The dyestuffs are fixed in general at normal or elevated temperature, advantageously at 40°–50° C.

By dyeing according to the usual dyeing processes in weakly acid, neutral or weakly alkaline dyestuffs solutions, the dyestuffs can likewise be applied to wool, silk, regenerated protein textile materials, polyamide textile materials and modified polyacrylonitrile textile materials. The pH-value of the dyebath can be varied during the drying process by appropriate admixtures, for example in such a way that the dyeing process is started at a pH-value of 4 which is raised to 7.5 in the course of the dyeing process.

The dyestuffs can likewise be applied to silk, wool and textile materials of regenerated protein fibers.

If the dyestuffs contain complex metal forming groups, for example o,o'-dihydroxyazo groupings or o,o'-hydroxycarboxyazo groupings, the dyeings obtained by using them can be treated according to known methods with metal yielding agents, for example with chrome or copper yielding agents.

The dyeings obtained with the water-soluble azo-dyestuffs of the present invention are generally distinguished by the purity of their shades and by a high tinctorial power. In connection with a treatment with an acid binding agent, intense shades are obtained on cellulose textile materials which shades possess a good to excellent fastness to washing and to light.

The following examples serve to illustrate the invention, but they are not intended to limit it thereto:

EXAMPLE 1

94 parts by weight of 1,3-diaminobenzene-4-sulfonic acid are dissolved in 980 parts by volume of water with the addition of dilute sodium hydroxide solution, so that a neutral aqueous solution is obtained. Within 3 hours and while stirring vigorously, a solution of 162.2 parts by weight of 4-(N-methyl-β-chlorethylsulfonylamino)-benzene-1-carboxylic acid chloride (melting point 55°–60° C.) in 250 parts by volume of acetone are dropwise added to the afore-mentioned solution at 0°–5° C. The hydrochloric acid formed in the condensation is saturated by means of a dilute sodium carbonate solution in such a way that the pH of 6.0–6.5 is maintained.

When the condensation is terminated, the partially precipitated condensation product is completely separated by the addition of sodium chloride, it is then filtered off and washed with adilute sodium chloride solution.

The compound obtained is dissolved in 1950 parts by volume of water, and after the addition of 34.5 parts by weight of sodium nitrite, poured into a mixture of 500 parts by weight of ice and 100 parts by weight of hydrochloric acid of 30% by weight. After 2 hours the diazotization is complete. The coupling is performed at 0°–10° C. with 162 parts by weight of 1-(2',5'-dichloro-4'-sulfophenyl)-3-methyl-5-pyrazolone which were dissolved in 450 parts by volume of water with the addition of sodium hydroxide while showing a weakly alkaline reaction. The pH value is maintained at 6 to 7 with the addition of sodium carbonate.

As soon as the coupling is complete, the dyestuff formed is salted out by means of potassium chloride, filtered off and dried at 60° C. There is obtained a yellow powder which dissolves in water to give a yellow solution. It dyes cellulose fibers according to the pad-dyeing process pure, greenish-yellow shades which are fast to boiling.

2 parts by weight of the dyestuff are dissolved in 100 parts by volume of water. A cotton fabric is impregnated with said solution, and the excess liquid is squeezed off in such a way that the fabric retains 80% of its weight of dyestuff solution. The so impregnated fabric is dried and impregnated with a solution which contains per liter 10 grams of sodium hydroxide and 300 grams of sodium chloride. It is then squeezed off to a liquid absorption of about 80% and steamed for 60 seconds at 100°–102° C. Subsequently, it is acidified, rinsed in boiling water and dried. There is obtained a clear greenish-yellow dyeing possessing good fastness properties, particularly a good fastness to washing.

If instead of a cotton fabric a staple fiber fabric is used, a similarly good result is obtained. From the condensation products of the formulae given in column I of the following table and the azo components indicated in column II dyestuffs are obtained which on cotton produce the tints given in column III, when operating according to the afore-mentioned working method.

| I | II | III |
|---|---|---|
| Diazo component | Azo component | Tint on cotton |
| 1. $H_3C$–$O_2S$–N(–$CH_2$–$CH_2$–Cl)–C$_6$H$_4$–CO–NH–C$_6$H$_3$(NH$_2$)–SO$_3$H | $H_2C$—C–$CH_3$, O=C, N, N-naphthyl(HO$_3$S)(SO$_3$H) | Yellow. |

TABLE—Continued

| | I | II | III |
|---|---|---|---|
| | Diazo component | Azo component | Tint on cotton |
| 2 | (structure: H₃C-O₂S-N(CH₂CH₂Cl)-C₆H₄-CO-NH-C₆H₃(NH₂)-SO₃H) | (pyrazolone with naphthyl-SO₃H) | Greenish-yellow. |
| 3 | Same as above | (pyrazolone with phenyl-SO₃H) | Yellow. |
| 4 | do | (pyrazolone with naphthyl-di-SO₃H) | Do. |
| 5 | (structure: CH₃-N(SO₂-CH₂-CH₂-Cl)-C₆H₄-CO-NH-C₆H₄-C₆H₃(SO₃H)(NH₂)) | (pyrazolone-COOH with phenyl-SO₃H) | Reddish-yellow. |
| 6 | (structure: H₃C-O₂S-N(CH₂CH₂Cl)-C₆H₄-CO-NH-C₆H₃(NH₂)-SO₃H) | (pyrazolone-COOH with chlorophenyl-SO₃H) | Greenish-yellow. |
| 7 | Same as above | (pyrazolone-CH₃ with phenyl-SO₃H) | Do. |

EXAMPLE 2

23.5 parts by weight of the sodium salt of the condensation product described in Example 1 from 1,3-diamino-benzene-4-sulfonic acid and 4-(N-methyl-β-chloroethyl-sulfonylamino)-benzene-1-carboxylic acid chloride are dissolved in 200 parts by volume of water and mixed with 10 parts by volume of 5 N-sodium nitrite solution. Within 1 hour this solution is poured at 0°–5° C. into a mixture of 50 parts by volume of water and 25 parts by volume of concentrated hydrochloric acid and stirred at this temperature until the diazotization is terminated. The suspension obtained is then neutralized by means of sodium bicarbonate and added to a solution of 20.5 parts by weight of the disodium salt of 8-acetyl-amino-1-hydroxynaphthalene-3,6-disulfonic acid in 110 parts by volume of water. By introducing 25 parts by weight of sodium acetate the pH value is maintained at 4.5.

After the coupling, the dyestuff formed is salted out by means of potassium chloride at 40° C., filtered off and dried. It dissolves in cold water to give a bluish-red solution, and in the presence of acid-binding agents it produces bluish-red prints on cellulose fibers, said prints being fast to washing.

For the production of the print-dyeing 20 parts by weight of the new dyestuff are dissolved with 50 parts by weight of urea in 200 parts by weight of hot water. While stirring, 400 parts by weight of a thickening paste, consisting of 40 parts by weight of sodium alginate and 960 parts by weight of water, and 20 parts by weight of sodium bicarbonate are added to the afore-mentioned solution. The paste is then made up to 1000 parts by weight with water and thickening paste.

A cotton fabric is printed with the so obtained printing paste, after drying for 5 minutes at 101°–103° C. it is steamed, rinsed with water, soaped at the boil, rinsed again and dried. There is obtained a bluish-red print possessing a good fastness to washing.

EXAMPLE 3

18.8 parts by weight of 1,4-diaminobenzene-2-sulfonic acid are dissolved in 200 parts by volume of water with the addition of a dilute sodium carbonate solution, so that a neutral aqueous solution is obtained. Within 90 minutes a solution of 31 parts by weight of 4-(N-methyl-β-chlorethyl sulfonylamino)-benzene-1-carboxylic acid chloride in 50 parts by volume of acetone are dropwise added to the afore-mentioned solution at 0°–5° C. while stirring vigorously. By simultaneously adding a 2 N-sodium carbonate solution drop by drop, the pH value is maintained at 6.5–7.0. When the condensation is complete, the compound formed is salted out by means of sodium chloride, filtered off and washed with a little ice-water.

The filtration residue is then dissolved in 200 parts by volume of water and after the addition of 7 parts by weight of sodium nitrite poured into a mixture of 100 parts by weight of ice and 30 parts by weight of hydrochloric acid of 30% by weight. When the diazotization is complete, the excess nitrite is removed and saturated by means of sodium carbonate. The coupling is performed at room temperature with 30.5 parts by weight of 1-hydroxy-naphthalene-3,6-disulfonic acid which were dissolved in 150 parts by volume of water with the addition of sodium hydroxide so that a neutral aqueous solution is obtained. With the addition of sodium acetate the pH-value is maintained at 5–6.5. As soon as the coupling is terminated, the dyestuff formed is isolated and dried. There is obtained a red-brown powder which easily dissolves in water to give a red solution. According to the printing process indicated in Example 2 the new dyestuff produces a clear red print which is fixed fast to boiling.

The dyestuffs of the following table, prepared according to Examples 2 and 3, dye wool or cotton in the tints indicated in the right colume of the table:

In the formulae of the following dyestuffs R represents the grouping $$-\text{NH}-\text{CO}-\underset{}{\bigcirc}-\underset{\text{CH}_3}{\overset{|}{\text{N}}}-\text{SO}_2-\text{CH}_2-\text{CH}_2-\text{Cl}$$

|   |   | Tint on wool or cotton |
|---|---|---|
| 1 | 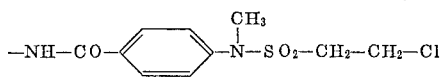 | Bluish-red. |
| 2 | 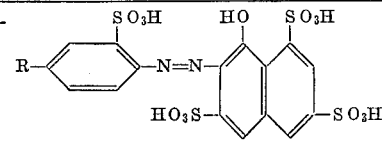 | Red-violet. |
| 3 | 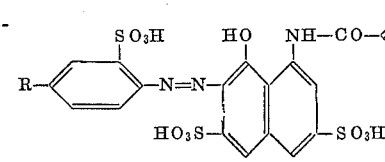 | Golden yellow. |
| 4 | 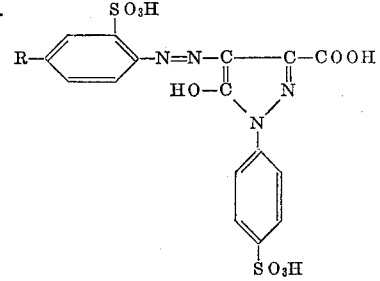 | Red. |
| 5 | 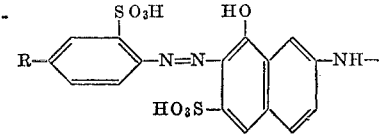 | Orange. |

TABLE—Continued

| No. | Structure | Tint on wool or cotton |
|---|---|---|
| 6 | R—C₆H₃(SO₃H)—N=N—[naphthalene with NH₂, SO₃H, HO₃S] | Do. |
| 7 | R—C₆H₃(SO₃H)—N=N—[naphthalene with NH₂, HO, SO₃H] | Red. |
| 8 | R—C₆H₃(COOH)—N=N—C(pyrazolone with CH₃, HO–C, N–C₆H₄–SO₃H) | Yellow. |
| 9 | R—C₆H₃(SO₃H)—N=N—[naphthalene with HO, SO₃H, HO₃S, SO₃H] | Red. |
| 10 | R—C₆H₃(SO₃H)—N=N—[naphthalene with HO, NH—CO—CH₃, HO₃S, SO₃H] | Red. |
| 11 | R—C₆H₃(SO₃H)—N=N—[naphthalene with HO, NH—CO—C₆H₅, HO₃S, SO₃H] | Bluish-red. |
| 12 | R—C₆H₃(SO₃H)—N=N—C(pyrazolone with C—COOH, HO–C, N–C₆H₄–NO₂) | Yellow. |
| 13 | R—C₆H₃(SO₃H)—N=N—C(triazole with C—COOH, HO–C, NH) | Do. |
| 14 | R—C₆H₃(SO₃H)—N=N—[naphthalene with HO, NH—CO—C₆H₄—Cl, HO₃S, SO₃H] | Bluish-red. |

TABLE—Continued

| | | Tint on wool or cotton |
|---|---|---|
| 15 | [structure: R–C₆H₃(SO₃H)–N=N–naphthalene(HO)(HO₃S)–NH–CO–NH₂] | Scarlet. |
| 16 | [structure: R–C₆H₃(COOH)–N=N–naphthalene(HO)(NH–CO–C₆H₅)(HO₃S)(SO₃H)] | Red-violet. |
| 17 | [structure: R–C₆H₃(SO₃H)–N=N–naphthalene(HO)(HO₃S)(SO₃H)] | Orange. |
| 18 | [structure: R–C₆H₃(SO₃H)–N=N–naphthalene(HO)(SO₃H)(SO₃H)] | Scarlet. |
| 19 | [structure: R–C₆H₃(SO₃H)–N=N–naphthalene(HO)(HO₃S)–NH–CO–CH₃] | Red-orange. |
| 20 | [structure: R–C₆H₃(SO₃H)–N=N–naphthalene(HO)(HO₃S)–NH–CO–NH–C₆H₄–SO₃H] | Do. |
| 21 | [structure: R–C₆H₃(SO₃H)–N=N–naphthalene(O)(NH–CO–NH–C₆H₅)(HO₃S)(SO₃H)] | Red. |

EXAMPLE 4

31.9 parts by weight of 1-amino-8-hydroxy-naphthalene-3,6-disulfonic acid are dissolved in 200 parts by volume of water with sodium bicarbonate at a pH-value of 6. While stirring vigorously 32.6 parts by weight of 4 - (N-methyl - β - chlorethylsulfonylamino) - benzene-1-carboxylic acid chloride, dissolved in 50 parts by volume of acetone are dropwise added to this solution within 1 hour at 0°–5° C., and the pH-value of the reaction mixture is maintained at 5.5–6.5 by gradually adding a dilute sodium carbonate solution drop by drop. If diazotizable amino groups can no longer be detected, the condensation product is salted out by means of sodium chloride, filtered off and washed with a dilute sodium chloride solution.

The compound obtained is then dissolved in 400 parts by volume of water. This solution is mixed with 16.5 parts by weight of sodium bicarbonate, into this mixture a solution, showing a neutral reaction to Congo paper, of 16.5 parts by weight of diazotized 1-amino-benzene-2-sulfonic acid in 250 parts by volume of water is introduced within 1 hour. When the coupling is complete, the dyestuff solution is filtered at 40° C. and then mixed with potassium chloride. The new dyestuff which has separated from the formula

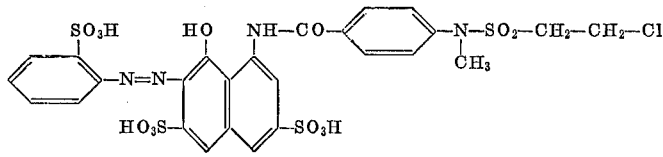

is filtered off, washed with a dilute potassium chloride solution and dried at 50°–60° C. in vacuo. There is obtained a dark powder which easily dissolves in water to give a red solution. According to the printing process described in Example 2 the dyestuff produces a brilliant red dyeing which is fixed fast to boiling.

If instead of 1-amino-8-hydroxynaphthalene-3,6-disulfonic acid the same quantity by weight of 1-amino-8-hydroxynaphthalene-4,6-disulfonic acid is used, there is obtained a dyestuff which possesses similar properties.

From the diazo components of the formulae given in column I and the azo components indicated in column II dyestuffs can be prepared which on cotton or wool produce the tints given in column III, when operating according to the above-mentioned working method. The radical R has the meaning given at the beginning of the table at the end of Example 3.

| | I | II | III |
|---|---|---|---|
| | Diazo component | Azo component | Tint on wool or cotton |
| 1 | 4-Cl, 3-CH₃, 1-NH₂, 6-SO₃H benzene | 1-HO, 8-R, 3,6-disulfo naphthalene | Bluish-red. |
| 2 | 3-CH₃, 1-NH₂, 6-SO₃H benzene | Same as above | Do. |
| 3 | 4-H₃CO, 1-NH₂, 6-SO₃H benzene | 1-HO, 8-R, 3,6-disulfo naphthalene | Purple. |
| 4 | 4-Cl, 6-Cl, 2-SO₃H, 1-NH₂ benzene | 1-HO, 8-R, 3,6-disulfo naphthalene | Bluish-red. |
| 5 | 1-SO₃H, 2-NH₂ naphthalene | Same as above | Do. |
| 6 | 2-SO₃H, 1-NH₂, 4-CF₃ benzene | do | Do. |
| 7 | HO₃S-naphthalene-NH₂-SO₃H | do | Do. |
| 8 | 2-SO₃H, 1-NH₂, HO₃S-naphthalene | do | Do. |
| 9 | 2-SO₃H, 1-NH₂, 4-R benzene | do | Red-violet. |
| 10 | 1-NH₂, 4-SO₃H benzene | do | Red. |
| 11 | CH₃—CO—HN—C₆H₄—NH₂ | do | Violet. |

TABLE—Continued

| | I<br>Diazo component | II<br>Azo component | III<br>Tint on wool or cotton |
|---|---|---|---|
| 12 | CH₃—CO—HN—C₆H₃(SO₃H)—NH₂ | ...do... | Do. |
| 13 | C₆H₄(COOH)—NH₂ | ...do... | Red. |
| 14 | SO₃H-phenyl-NH₂ with HN—triazine(Cl,Cl) | ...do... | Bluish-red. |

EXAMPLE 5

23.9 parts by weight of 2-amino-5-hydroxy-naphthalene-7-sulfonic acid are dissolved in 600 parts by volume of water with the addition of dilute sodium hydroxide solution so that a neutral aqueous solution is obtained. To this solution a soltuion of 35.5 parts by weight of 4-(N-methyl-β-chloroethyl - sulfonylamino) - benzene-1-carboxylic acid chloride in 100 parts by volume of acetone is dropwise added within 3 hours at 5°–10° C. while stirring vigorously, and an aqueous sodium carbonate solution is simultaneously added in such a way that the reaction mixture always shows a weakly acid reaction. As soon as amino groups can no longer be detected, the solution is filtered and then combined with a solution, showing a neutral reaction to Congo paper, of 30 parts by weight of diazotized 2-aminoaphthalene-1,7-disulfonic acid in 380 parts by volume of water at 10°–15° C.

By the addition of sodium carbonate the pH-value is adjusted to 6.7–7, and stirring is continued until the coupling is complete. The new dyestuff of the formula

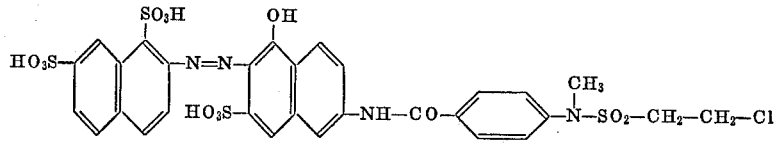

is salted out with sodium chloride, filtered with suction, and after washing with a dilute sodium chloride solution, dried at 50° C. It is a red powder which dissolves in water to give an organge-red solution. In the presence of an acid-binding agent the dyestuff dyes cellulose fibers brilliant orange shades which are fast to boiling. Further dyestuffs which can be prepared according to this working method from the diazo components indicated sub I of the following table and from the azo components indicated sub II produce the tints mentioned in column III, R having the meaning given at the beginning of the table at the end of Example 3.

| | I<br>Diazo component | II<br>Azo component | III<br>Tint on cotton |
|---|---|---|---|
| 1 | CH₃O—C₆H₃(SO₃H)—NH₂ | HO₃S—naphthyl(OH)—R | Scarlet. |
| 2 | naphthyl(SO₃H)(SO₃H)—NH | Same as above | Orange. |
| 3 | HO₃S—C₆H₃(SO₃H)—NH₂ | ...do... | Do. |

TABLE—Continued

| | I — Diazo component | II — Azo component | III — Tint on cotton |
|---|---|---|---|
| 4 | HO₃S—[naphthalene]—NH₂, SO₃H | HO—[naphthalene]—SO₃H, HO₃S—, R | Scarlet. |
| 5 | COOH—[benzene]—NH₂, SO₃H | OH—[naphthalene]—, HO₃S—, R | Orange. |
| 6 | SO₃H—[naphthalene]—NH₂, HO₃S—, SO₃H | Same as above | Do. |
| 7 | SO₃H—[naphthalene]—NH₂, SO₃H | OH—[naphthalene]—, HO₃S—, —N(CH₃)—CO—[phenyl]—N(CH₃)—SO₂—CH₂—CH₂—Cl | Do. |
| 8 | Same as above | OH—[naphthalene]—, HO₃S—, R, SO₃H | Reddish-orange. |
| 9 | SO₃H—[naphthalene]—NH₂, HO₃S— | OH—[naphthalene]—, HO₃S—, —N(CH₂—CH₂—OH)—CO—[phenyl]—N(CH₃)—SO₂—CH₂—CH₂—Cl | Orange. |
| 10 | SO₃H—[naphthalene]—NH₂, HO₃S—, SO₃H | OH—[naphthalene]—, HO₃S—, —NH—CO—NH—[phenyl]—R | Reddish-orange. |

EXAMPLE 6

31.9 parts by weight of 1-amino-8-hydroxy-naphthalene-3,6-disulfonic acid are dissolved in 150 parts by volume of water with the addition of dilute sodium hydroxide solution so that a neutral aqueous solution of the dyestuff is obtained. Into this solution of 38 parts by weight of 4-(N-methyl-β-chloroethyl-sulfonylamino)-benzene-1-isocyanate (boiling point 175° C. under a pressure of 0.15 mm. of mercury) in 90 parts by volume of acetone is introduced within 1 hour at 0° C. while stirring. After the reaction the product is precipitated by means of sodium chloride, filtered off and dissolved in 300 parts by volume of water at 0°–5° C. This solution is mixed with 15 parts by weight of sodium hydrogen carbonate and a solution, showing a neutral reaction to Congo paper, of 17.3 parts by weight of diazotized 1-aminobenzene-2-sulfonic acid is added within 30 minutes. As soon as the coupling is complete, the dyestuff formed is salted out with potassium chloride, filtered off and washed with a dilute potassium chloride solution. The new dyestuff of the formula

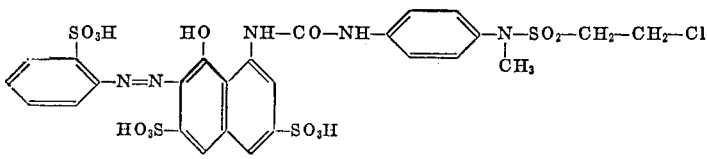

is a dark powder which dissolves in water to give a red solution.

When operating according to the working method described at the end of Example 2 the dyestuff produces brilliant red dyeings on cellulose fibers which dyeings possess a good fastness to washing and to light.

If instead of 1-amino-8-hydroxy-naphthalene-3,6-disulfonic acid the same quantity of 1-amino-8-hydroxynaphthalene-4,6-disulfonic acid is used or if instead of 4-(N-methyl-β-chloroethyl-sulfonylamino) - benzene - 1 - isocyanate, 35.4 parts by weight of 3-(N-methyl-vinylsulfonylamino) - benzene - 1 - isocyanate (boiling point 144–145.5° C. under a pressure of 0.1 mm. of mercury; melting point 58.5–59.3° C.) or 35.4 parts by weight of 4-(N-methylvinylamino) - benzene - 1 - isocyanate (boiling point 154.5–159.5° C. under a pressure of 0.33–0.37 mm. of mercury; melting point 51–51.5° C.) or 38 parts by weight of 3-(N-methylvinyl-sulfonylamino)-benzene-4-chloro-1-isocyanate (boiling point 160°–170° C. under a pressure of 0.5 mm. of mercury; melting point 53°–55° C.) are used, dyestuffs are obtained which possess similarly good properties.

The dyestuffs indicated in the following table can be prepared in a corresponding way:

| | I | II | III |
|---|---|---|---|
| | Diazo component | Azo component | Tint on polyamide fibers or cotton |
| 1 | 2-amino-naphthalene-1-sulfonic acid | 1-hydroxy-naphthalene-3,6-disulfonic acid with R₁ | Bluish-red. |
| 2 | aniline | 1-hydroxy-naphthalene-3,6-disulfonic acid with R₂ | Do. |
| 3 | 4-chloro-2-aminobenzene-sulfonic acid | 1-hydroxy-naphthalene-3,6-disulfonic acid with R₂ | Do. |
| 4 | aniline | 1-hydroxy-naphthalene-3,6-disulfonic acid with R₃ | Red. |
| 5 | 2-amino-benzene-1,4-disulfonic acid | Same as above | Red. |
| 6 | complex diazo component with SO₃H, NH₂, CO—NH, H₃C, O₂S—N, CH₂, CH₂—Cl | 1-hydroxy-naphthalene-3,6-disulfonic acid with R₂ | Bluish red. |
| 7 | 2-amino-benzene-1,4-disulfonic acid | 1-hydroxy-naphthalene-sulfonic acid with R₁ | Orange. |
| 8 | 2-amino-5-sulfo-benzoic acid | Same as above | Do. |

TABLE—Continued

| I | II | III |
|---|---|---|
| Diazo component | Azo component [1] | Tint on polyamide fibers or cotton |
| 9. [structure: naphthalene with SO₃H, HO₃S, SO₃H, NH₂] | [structure: naphthol with OH, HO₃S, R₂] | Do. |
| 10. [structure: HO₃S-phenyl-NH₂] | [structure: naphthol with HO, HO₃S, R₃] | Scarlet. |
| 11. [structure: benzene with OCH₃, NH₂, HO₃S] | Same as above | Red. |
| 12. [structure: naphthalene with SO₃H, NH₂, SO₃H] | [structure: naphthol with HO, HO₃S, R₂] | Scarlet. |
| 13. [structure: benzene with SO₃H, NH₂] | Same as above | Do. |

[1] In the formulae of the following azo components R₁ represents the grouping

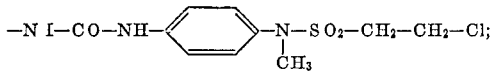

$$-N\text{I}-CO-NH-\langle\text{phenyl}\rangle-N(CH_3)-SO_2-CH_2-CH_2-Cl;$$

R₂ represents the grouping

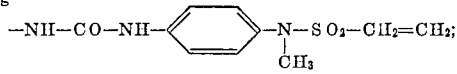

$$-NH-CO-NH-\langle\text{phenyl}\rangle-N(CH_3)-SO_2-CH_2=CH_2;$$

and R₃ represents the grouping

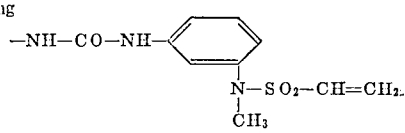

$$-NH-CO-NH-\langle\text{phenyl}\rangle-N(CH_3)-SO_2-CH=CH_2.$$

EXAMPLE 7

31.9 parts by weight of 1-amino-8-hydroxy-naphthalene-3,6-disulfonic acid are condensed as described in the working method of Example 4 with 35 parts by weight of 4-(N-methyl-β-acetoxyethyl-sulfonylamino)-benzene-1-carboxylic acid chloride (boiling point 206–209° C. under a pressure of 0.3 mm. of mercury) and combined with 16.5 parts by weight of diazotized 1-aminobenzene-2-sulfonic acid. When the coupling is complete, the dyestuff formed of the formula

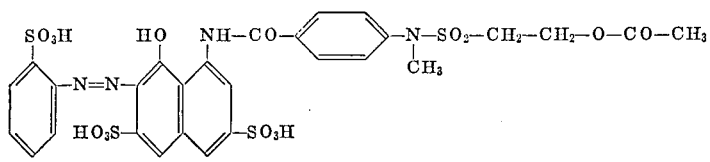

is salted out with potassium chloride, filtered off and washed with a dilute potassium chloride solution. After drying, a dark powder is obtained which dissolves in water to give a red solution. According to the printing process described in Example 2 the dyestuff produces a brilliant red dyeing on cotton which dyeing is fixed fast to boiling.

EXAMPLE 8

16.8 parts by weight of phenolchlorocarbonic acid ester are dropwise added to a neutral to weakly acid solution of 26.1 parts by weight of the sodium salt of 2-amino-5-hydroxy-naphthalene-7-sulfonic acid in 400 parts by volume of water at 35°–40° C. By dropwise adding a dilute sodium carbonate solution at the same time, the pH-value is maintained at 6.2–7. If amino groups can no longer be detected by diazotization, a solution of 35 parts by weight of the potassium salt of 4-(N - methyl - ethionyl-amino)-1-aminobenzene dissolved in 400 parts by volume of water is added, and the pH-value is adjusted to 7.2–7.3 by means of sodium bicarbonate. The mixture is then heated to 40° C. and stirred for 10 hours at this temperature. After the reaction it is combined with a solution of 24.1 parts by weight of diazotized 1-aminobenzene-2.5-disulfonic acid, and the hydrochloric acid formed is saturated with 16 parts by weight of sodium bicarbonate. The coupling being complete, the new dyestuff of the following formula

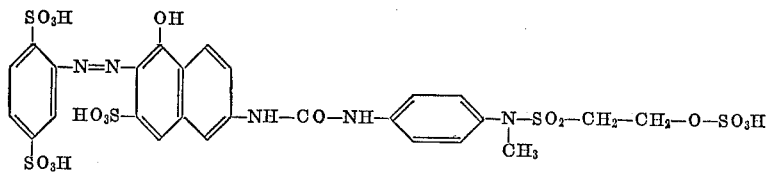

is isolated and dried. There is obtained an orange powder which dissolves in water to give a reddish-yellow solution. According to the dyeing process described in Example 1 the dyestuff produces on cellulose fibers a clear orange possessing a good fastness to washing.

When using the afore-mentioned azo component and the diazocomponents indicated in the following table, dyestuffs are obtained which possess similar properties and show the following tints:

| Diazo component | Tint on cotton |
|---|---|
| (1) 4-methoxy-1-aminobenzene-3-sulfonic acid | Scarlet. |
| (2) 2-amino-naphthalene-1,5-disulfonic acid | Do. |
| (3) 2-amino-naphthalene-1,5,7-trisulfonic acid | Do. |
| (4) 2-amino-naphthalene-1,7-disulfonic acid | Do. |
| (5) 2-amino-naphthalene-1,5-disulfonic acid | Orange. | and is a red powder which dissolves in water to give an orange-red solution. In the presence of sodium bicarbonate the new dyestuff produces an intense reddish-orange print on cotton which print possesses a very good fastness to washing.

EXAMPLE 10

23.9 parts by weight of 2-amino-8-hydroxy-naphthalene-6-sulfonic acid are dissolved in 200 parts by volume of water with the addition of a dilute sodium carbonate solution so that a neutral aqueous solution is formed. To this solution a solution of 33 parts by weight of 4-(N-methyl-vinylsulfonylamino)-benzene-1-carboxylic acid chloride in 80 parts by volume of acetone are dropwise added within 60 minutes at 0°–5° C. while stirring vigorously. Simultaneously a sodium carbonate solution of 10% by weight is dropwise added in such a way that the pH-value is maintained at 6.0–6.5. As soon as the condensation is complete, a diazo suspension prepared from 30.3 parts by weight of 2-amino-naphthalene-4,8-disulfonic acid, 20 parts by volume of hydrochloric acid of 30% by weight, 7 parts by weight of sodium nitrite and 200 parts by volume of water is caused to flow into the afore-mentioned solution. By the addition of solid sodium bicarbonate the pH-value is maintained at 6–6.5. The coupling being complete, the dyestuff formed of the formula

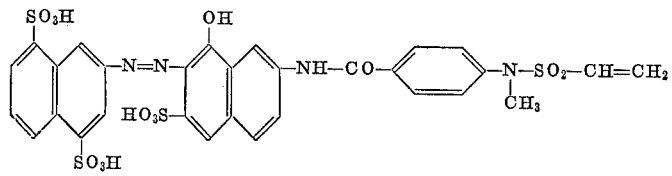

is salted out with sodium chloride and isolated. It is a dark powder which dissolves in water to give a red solution. The new dyestuff dyes cotton red shades of a good fasteness to washing.

EXAMPLE 11

31.8 parts by weight of 2,6-diamino-naphthalene-4,8-disulfonic acid are dissolved in 400 parts by volume of water with the addition of dilute sodium hydroxide solution so that a neutral aqueous solution is formed. Into this solution a solution of 36 parts by weight of 4-(N-methyl-β-chloroethylsulfonylamino) - benzene - 1 - carboxylic acid chloride in 100 parts by volume of acetone are introduced within 3 hours at 0°–5° C. while stirring vigorously. By simultaneously adding a dilute sodium carbonate solution drop by drop the pH-value is maintained at 4.5–5.5 during the condensation reaction. After the afore-mentioned acid chloride has been consumed, the partially precipitated product is completely separated by introducing sodium chloride, isolated and recrystallized from water.

The compound thus obtained is dissolved in 500 parts by volume of water and mixed with 40 parts by weight of hydrochloric acid of 30% by weight. In order to diazotize

EXAMPLE 9

23.9 parts by weight of 2-amino-8-hydroxy-naphthalene-6-sulfonic acid are dissolved in 550 parts by volume of water with the addition of dilute sodium hydroxide solution so that a neutral aqueous solution is obtained. Into this solution a solution of 36 parts by weight of 4-(N-methyl-β-chloroethylsulfonylamino) - benzene - 1 - carboxylic acid chloride in 80 parts by volume of acetone is dropwise introduced within 90 minutes at 0°–5° C. while stirring. Finely pulverized sodium bicarbonate is simultaneously introduced into the reaction mixture in such a way that the pH-value is constantly maintained at 6.5–6.9. As soon as the condensation is terminated, 5 parts by weight of animal charcoal are added, the condensation product is stirred for 20 minutes at 30°–40° C. and filtered. The solution obtained is then combined at 5°–10° C. with a solution, showing a neutral reaction to Congo paper, of 27.3 parts by weight of diazotized 1 - aminobenzene - 2,5 - disulfonic acid. By the addition of sodium acetate the pH-value is maintained at 5–6. The coupling being complete, the dyestuff is isolated in the usual manner and dried. It has the following constitution.

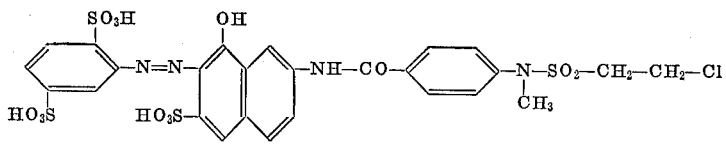

the amine a solution of 7 parts by weight of sodium nitrite in 40 parts by volume of water is gradually added drop by drop at 5°–10° C. The suspension of the diazonium salt obtained is then combined within 1 hour at 0° C. with a solution of 27 parts by weight of 1-(4'-sulfophenyl)-3-methyl-5-pyrazolone and 50 parts by weight of sodium carbonate in 2,000 parts by volume of water. The monoazo-dyestuff formed is finally salted out with sodium chloride, filtered off, washed with a dilute sodium chloride solution and dried. It is an orange powder which dissolves in water to give a reddish-yellow solution. It dyes cotton or textile material from regenerated cellulose golden-yellow shades of a good fastness to washing.

EXAMPLE 12

57.8 parts by weight of the compound of the formula

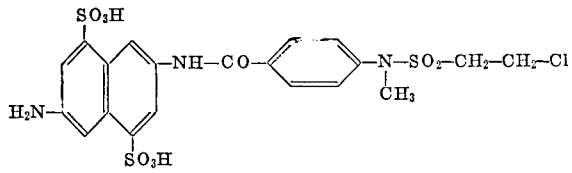

obtained by condensation of 2-amino-6-nitronaphthalene-4,8-disulfonic acid with 4-(N-methyl-β-chloroethylsulfonylamino)-benzene-1-carboxylic acid chloride and subsequent catalytic reduction, are dissolved in the form of the sodium salt in 950 parts by volume of water. This solution is mixed with 40 parts by weight of hydrochloric acid of 30% by weight and then gradually with a solution of 7 parts by weight of sodium nitrite in 30 parts by volume of water. After the diazotization, the suspension of the diazonium compound thus obtained is combined at 0° C. with a solution of 35 parts by weight of 1-(2'-4'-disulfophenyl)-3-methyl-5-pyrazolone and 50 parts by weight of sodium carbonate in 1,250 parts by volume of water. The monoazo dyestuff formed is salted out with potassium chloride, filtered off and dried at 50° C. in vacuo. It is a red-brown powder which dissolves in water to give a reddish-yellow solution. The new dyestuff dyes cotton or textile material from regenerated cellulose yellow-orange shades of a good fastness to washing.

If in Example 11 instead of 27 parts by weight of 1-(4'-sulfophenyl)-3-methyl-5-pyrazolone or in Example 12 instead of 35 parts by weight of 1-(2',4'-disulfophenyl)-3-methyl-5-pyrazolone corresponding parts by weight of the azo components indicated in the following table are used and if these azo components are combined with the diazo component prepared according to Examples 11 or 12, dyestuffs are obtained which on cellulose produce dyeings of a similarly good wet-fastness if the dyeing or printing process described above is used.

| Azo component | Tint on cotton |
| --- | --- |
| (1) 1-(4'-sulfophenyl)-3-carboxy-5-pyrazolone | Golden-yellow. |
| (2) 1-(2',5'-disulfophenyl)-3-carboxy-5-pyrazolone | Do. |
| (3) 1-(2',5'-dichloro-4'-sulfophenyl)-3-methyl-5-pyrazolone | Reddish-yellow. |
| (4) 1-hydroxy-naphthalene-3,6-disulfonic acid | Red. |
| (5) 8-acetylamino-1-hydroxynaphthalene-3,6-disulfonic acid | Red. |
| (6) 2-hydroxy-naphthalene-3,6-disulfonic acid | Red. |
| (7) 1-(3'-sulfophenyl)-3-methyl-5-pyrazolone | Yellow-orange. |
| (8) 2-hydroxy-naphthalene-6,8-disulfonic acid | Red. |
| (9) 1-(5',7'-disulfo-2'-naphthyl)-3-methyl-5-pyrazolone | Reddish-yellow. |

EXAMPLE 13

48.2 parts by weight of the disodium salt of 1-(3'-aminobenzoylamino) - 8 - hydroxynaphthalene-3,6-disulfonic acid are dissolved in 855 parts by volume of water. Into this solution a solution of 35 parts by weight of 4-(N-methyl-β-chlorethylsulfonylamino)-benzene - 1 - carboxylic acid chloride in 80 parts by volume of acetone is dropwise introduced in the course of 2 hours, and simultaneously a 2 N-sodium carbonate solution is dropwise added in such a way that the pH-value is maintained at 6.6–7. The temperature of the mixture is kept between 0° and 5° C. The mixture is stirred for 8 hours at this pH-value and at this temperature, and after the condensation, it is mixed with a suspension of the diazo compound from 16.0 parts by weight of 1-aminobenzene-2-sulfonic acid.

By the addition of sodium carbonate the pH-value of the mixture is maintained at 7 during the coupling. The coupling being complete, the dyestuff formed is salted out with sodium chloride, filtered off and, after washing with a dilute sodium chloride solution, dried at 50°–60° C. in vacuo.

The new dyestuff of the formula

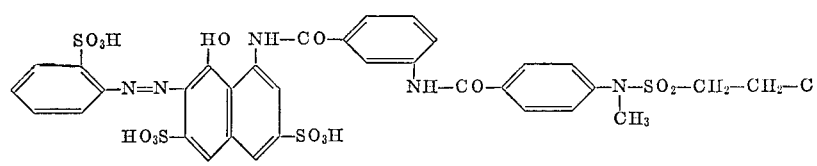

is a dark powder which dissolves in water to give a bluish-red solution, it dyes cotton according to the method described at the end of Example 1 bluish-red shades which possess a very good fastness to washing.

If instead of 4-(N-methyl-β-chlorethylsulfonylamino)-benzene-1-carboxylic acid chloride, 33 parts by weight of 4-(N-methylvinyl-sulfonylamino)-benzene-1-sulfonic acid chloride (melting point 74°–75° C.) are used, there is obtained a dyestuff possessing similar properties.

If the diazonium compound of 16 parts by weight of 1-aminobenzene-2-sulfonic acid is replaced by the equimolecular quantity of the diazonium compound of 1-aminobenzene-2,5-disulfonic acid, 1 - amino-4-methyl-5-chlorobenzene-2-sulfonic acid, 1-amino-4-methylbenzene-2-sulfonic acid, 1-amino-3-methylbenzene-6-sulfonic acid, 2 - aminonaphthalene - 3,6-disulfonic acid or 1-amino-4-chlorobenzene - 2 - sulfonic acid, dyestuffs are obtained which possess the same good fastness to washing.

EXAMPLE 14

To a solution of 26.1 parts by weight of the sodium salt of 1-amino-5-hydroxynaphthalene-7-sulfonic acid in 400 parts by volume of water a solution of 36 parts by weight of 4 - (N-methyl-β-chlorethylsulfonylamino)-benzene-1-carboxylic acid chloride in 100 parts by volume of chloroform are slowly added at 0°–5° C. while stirring vigorously. In the course of 90–120 minutes a dilute sodium carbonate solution is simultaneously added drop by drop in such a way that the pH-value of the reaction mixture is maintained between 5 and 6.6. After the condensation, the chloroform is distilled off, treated with 10 parts by weight of kieselguhr and 3 parts by weight of animal charcoal for 20 minutes at 30° C. and filtered.

Subsequently, the diazo compound, prepared in usual manner from 17.3 parts by weight of 1-aminobenzene-3-sulfonic acid is introduced, and the pH-value of the coupling mixture is maintained at 6–6.5 by strewing sodium bicarbonate into it. The product is salted out with sodium chloride and isolated. The dyestuff obtained of the formula

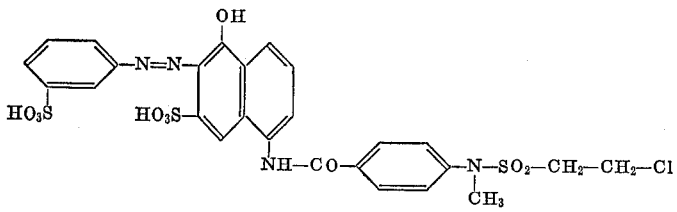

dyes cellulose fibers reddish orange shades which possess a very good fastness to washing.

If a diazo component 1-aminobenzene-2-sulfonic acid or 1-aminobenzene-2-carboxylic acid is used, dyestuffs are obtained which possess similar properties. When using diazotized 2 - aminonaphthalene-4,8-disulfonic acid or 1-amino - 4-methoxybenzene-2-sulfonic acid, dyestuffs are obtained which in the presence of sodium bicarbonate produce red prints on cotton.

EXAMPLE 15

16.8 parts by weight of phenyl-chlorocarbonic acid ester are condensed with 26.1 parts by weight of the sodium salt of 2-amino-5-hydroxynaphthalene-7-sulfonic acid according to the indications of Example 8. If amino groups can no longer be detected by diazotization, a solution of 34.8 parts by weight of the potassium salt of 3-(N-methylethionylamino)-1-aminobenzene, dissolved in 420 parts by volume of water is added, and the pH-value is adjusted to 7.2–7.3 by means of sodium bicarbonate. The mixture is then heated to 40° C. and stirred at this temperature until the reaction is terminated. It is then combined with a solution of 24.1 parts by weight of diazotized 1-aminobenzene-2,5-disulfonic acid, and the hydrochloric acid formed is saturated with 16 parts by weight of sodium bicarbonate. After the coupling, the new dyestuff of the following formula

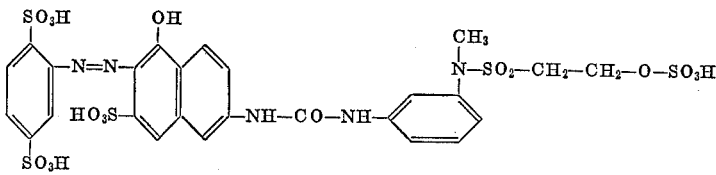

is isolated and dried. There is obtained a brownish-orange powder which dissolves in water to give an orange solution. According to the dyeing process described in Example 1 the dyestuff produces an orange dyeing on cellulose fibers which dyeing possesses a good fastness to washing.

If instead of 34.8 parts by weight of the potassium salt of 3-(N-methyl-ethionylamino)-4-methoxy-1-aminobenzene 36.3 parts by weight of the potassium salt of 4-(N-ethylethionylamino)-1-aminobenzene are used, a similar dyestuff is obtained which possesses a good to excellent fastness to washing.

EXAMPLE 16

26.1 parts by weight of the sodium salt of 2-amino-5-hydroxynaphthalene-7-sulfonic acid are reacted as described in Example 8 first with 16.8 parts by weight of phenyl-chlorocarbonic acid ester and then with 35 parts by weight of the potassium salt of 4-(N-methyl-ethionylamino)-1-aminobenzene. After the condensation the reaction product is combined with a solution of 16.5 parts by weight of diazotized 1-aminobenzene-2-sulfonic acid, and the hydrochloric acid formed is saturated by means of 16 parts by weight of sodium bicarbonate. The coupling being complete, the new dyestuff of the following formula

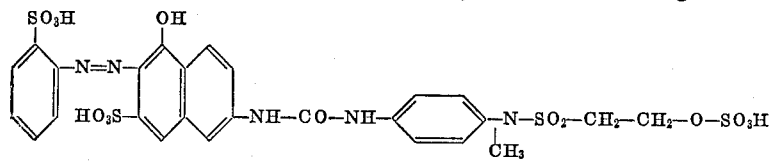

is isolated and dried. There is obtained an orange powder which dissolves in water to give a reddish-yellow solution. It dyes wool clear orange shades which possess an excellent fastness to light and a good wet-fastness.

The dyeing is, for example, performed as follows:

1 part by weight of the dyestuff is dissolved in a solution, neutralized with acetic acid, of 1 part by weight of trisodium phosphate in 100 parts by volume of water and added to a dyebath consisting of 2,500 parts by volume of water, 5 parts by weight of sodium sulfate, 1 part by weight of a commercially nonionic levelling agent and 2.5 parts by weight of acetic acid of 30% by weight. A woolen fabric is introduced into the bath, heated at the boil and dyed for 1 hour at the boiling temperature. The dyed material is then rinsed with water, centrifuged and treated for 10 minutes at 80° C. with a solution of 2 parts by weight of disodium phosphate in 1000 parts by volume of water. After acidification, rinsing and drying there is obtained an orange dyeing possessing good to excellent fastness properties.

EXAMPLE 17

31.9 parts by weight of 1-amino-8-hydroxy-naphthalene-3,6-disulfonic acid are condensed according to the working method described in Example 4 with 37.1 parts by weight of 4-(N-ethyl-β - chloroethyl - sulfonylamino)-benzene-1-carboxylic acid chloride and combined with 16.5 parts by weight of diazotized 1-aminobenzene-2-sulfonic acid. The coupling being complete, the dyestuff formed of the following formula

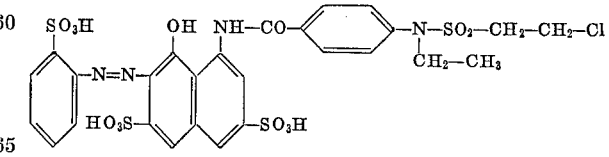

is salted out with potassium chloride, filtered off and washed with dilute potassium chloride solution.

After drying, there is obtained a dark powder which dissolves in water to give a red solution. In the presence of sodium trichloracetate the dyestuff produces a brilliant red print on cotton which print is fixed fast to boiling.

If instead of 37.1 parts of weight of 4-(N-ethyl-β-chlorethyl-sulfonylamino) - benzene - 1 - carboxylic acid chloride, 40.9 parts by weight of 4-(N-butyl-β-chlorethyl-sulfonylamino)-benzene-1-carboxylic acid chloride or 44.6 parts by weight of 4-(N-benzyl-vinylsulfonylamino)-benzene-1-carboxylic acid chloride (melting point 84° C.) or 46.2 parts by weight of 4-(N-methyl-β-bromethyl-sulfonylamino)-benzene-carboxylic acid bromide are used, dyestuffs are obtained which on cellulose produce dyeings of similarly good wet-fastness properties.

EXAMPLE 18

55 parts by weight of the condensation product of the formula

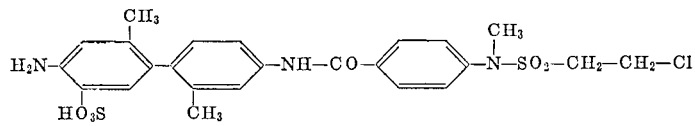

prepared from 1 mol of 4-(N-methyl-β-chlorethyl-sulfonylamino)-benzene-1-carboxylic acid chloride and 1 mol of 4,4-diamino-2,2-dimethyl-1,1-diphenyl-5-sulfonic acid, are diazotized in usual manner with 7.1 parts by weight of sodium nitrite at 0°–5° C. The diazo compound obtained is coupled at 2°–5° C. with 24 parts by weight of 2-amino-8-hydroxy-naphthalene-6-sulfonic acid which are suspended in 280 parts by volume of water.

By strewing in crystalline sodium acetate the acid is saturated until it shows a neutral reaction to Congo paper. The dyestuff formed is precipitated with sodium chloride, isolated and dried. It is a dark powder which dissolves in water to give a red solution.

In an acetic dyebath a red dyeing is obtained on wool, which dyeing possesses an excellent fastness to light, washing and perspiration.

The following table contains further monoazo dyestuffs which can be prepared from the diazo components indicated in column I and from the azo components indicated in column II. The dyestuffs are characterized by the dyed material (column III) and by the tints of the dyeings obtained (column IV).

The radical R has the meaning given at the head of the table at the end of Example 3.

$R_1$ represents the grouping

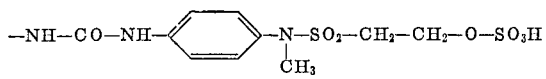

and $R_2$ represents the grouping

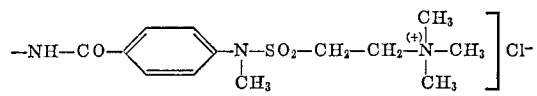

| | I | II | III | IV |
|---|---|---|---|---|
| | Diazo component | Azo component | Dyed material | Tint of the dyeing |
| 1 | R—[phenyl(Cl,Cl)]—NH₂ (with Cl, SO₃H substituents) | OH—[naphthyl]—SO₃H (with HO₃S) | Cotton | Red. |
| 2 | HO₃S—[phenyl]—NH₂ | R—[phenyl(O=C-OH)]—NH—CO—CH₂—CO—CH₃ | Wool | Yellow. |
| 3 | [phenyl(SO₃H)]—NH₂ | HO, R₂—[naphthyl]—SO₃H (with HO₃S) | do | Red. |
| 4 | [phenyl(SO₃H, R₁)]—NH₂ | HO, R₁—[naphthyl]—SO₃H (with HO₃S) | do | Red. |
| 5 | R—[phenyl(CH₃)—phenyl(CH₃, SO₃H)]—NH₂ | pyrazolone with CH₃, N-phenyl-SO₃H | Silk | Yellow. |
| 6 | R—[phenyl]—CO—NH—[phenyl]—NH₂ | HO, NH—CO—CH₃—[naphthyl]—SO₃H (with HO₃S) | Cotton | Bluish-red. |

| I | II | III | IV |
|---|---|---|---|
| Diazo component | Azo component | Dyed material | Tint of the dyeing |
| 7. $HO_3S-\langle\rangle-NH_2$ | (structure with OH, $HO_3S$ naphthalene, N-CH$_2$-phenyl, CO-phenyl-N(CH$_3$)-SO$_2$-CH$_2$-CH$_2$-Cl) | Wool | Scarlet. |

We claim:
1. A monoazo-dyestuff of the formula

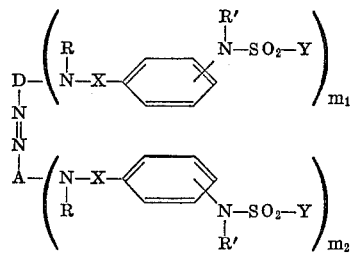

wherein D represents phenyl, monosulfophenyl, disulfophenyl, monocarboxyphenyl, monosulfo-monocarboxyphenyl, monochloro - monosulfo - phenyl, mono - lower alkyl - monochloro - monosulfo - phenyl, mono(lower alkyl) - monosulfo - phenyl, mono(lower alkoxy)-monosulfo - phenyl, dichloro - monosulfo - phenyl, monotrifluoromethyl - monosulfo - phenyl, mono - acetylaminophenyl, mono - benzoylamino - phenyl, mono - acetylamino - monosulfo - phenyl, mono - (dichloro - triazinylamino) - phenyl, monosulfo - naphthyl, disulfonaphthyl, trisulfonaphthyl,

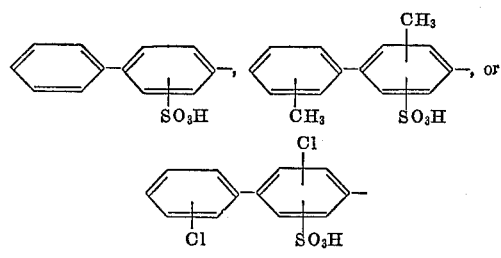

A represents the radical of a coupling compound of the group consisting of
(a) Hydroxynaphthalene substituted by 1 to 3 sulfonic acid groups and in addition by $-NH-CO-CH_3$,

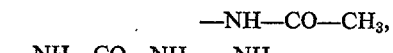

(b) 3 - carboxy - 5 - pyrazolone or a 1-phenyl (or 1-naphthyl)-5-pyrazolone substituted in the 3-position by methyl or carboxyl;
(c) 1-phenyl (or 1-naphthyl)-5-pyrazolone substituted in the 3-position by methyl or carboxyl and substituted on the phenyl or naphthyl by 1 to 2 sulfonic acid groups or by nitro;
(d) 1-phenyl (or 1-naphthyl)-5-pyrazolone substituted in the 3-position by methyl or carboxyl and substituted on the phenyl or naphthyl by a sulfonic acid group and 1 to 2 chlorine atoms; and
(e) acetoacetic acid phenylamide substituted on the phenyl group by sulfonic acid group or carboxylic acid group;

R represents a member of the group consisting of hydrogen and lower alkyl, X represents a member of the group consisting of $-SO_2-$, $-CO-$ and $-CO-NH-$; Y represents a member of the group consisting of $-CH_2-CH_2-Cl$, $-CH_2CH_2-Br$, $-CH_2-CH_2-O-SO_3H$, $-CH_2-CH_2-O-CO-CH_3$, $-CH_2-CH_2-O-\langle\rangle$, $[-CH_2-CH_2-\overset{(+)}{N}-\langle\rangle]$ Cl$^-$, $-CH_2-CH_2-\overset{(+)}{N}(\text{lower alkyl})_3]$Cl$^-$ and $-CH=CH_2$; R' represents lower alkyl or benzyl, and $m_1$ and $m_2$ represent integers from 0 to 2, the sum of $m_1$ and $m_2$ being at most 2 and at least 1.

2. The monoazo-dyestuff of the formula

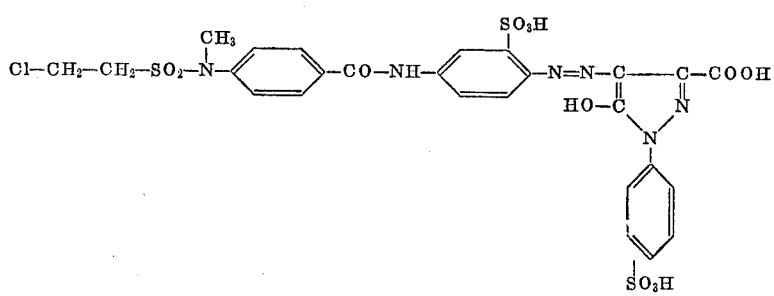

3. The monoazo-dyestuff of the formula
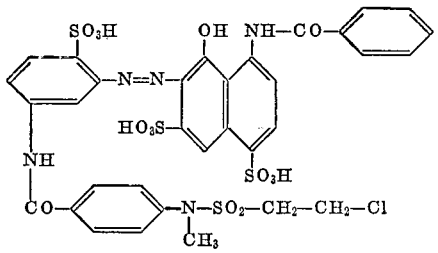
4. The monoazo-dyestuff of the formula
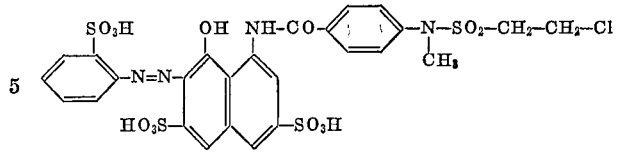
5. The monoazo-dyestuff of the formula
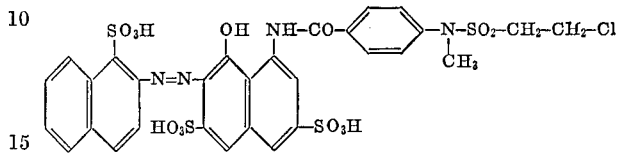
6. The monoazo-dyestuff of the formula
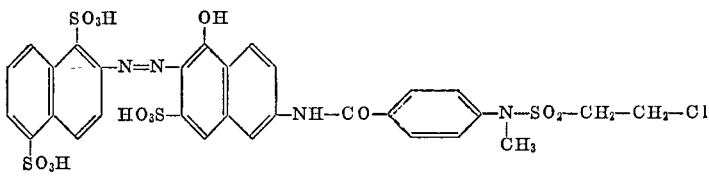
References Cited
UNITED STATES PATENTS
2,128,255   8/1938   Krzikalla et. al. ___ 260—150 X
3,135,730   6/1964   Heyna et. al. _____ 260—147
FOREIGN PATENTS
875,946   8/1961   Great Britain _____ 260—199
CHARLES B. PARKER, Primary Examiner
D. M. PAPUGA, Assistant Examiner
U.S. Cl. X.R.
260—153, 194, 196, 199, 200, 310 C; 8—13, 54, 54.2, 177, 178